(12) United States Patent
Hullahalli et al.

(10) Patent No.: US 11,323,325 B1
(45) Date of Patent: May 3, 2022

(54) SYSTEM AND METHOD FOR REMOTE CONFIGURATION OF SCALABLE DATACENTER

(71) Applicant: AT&T Intellectual Property I, L.P., Atlanta, GA (US)

(72) Inventors: Srinandan Hullahalli, Frisco, TX (US); Sunil Maloo, Edison, NJ (US); Anestis Karasaridis, Oceanport, NJ (US); Robert Roschewsk, Washington, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/240,336

(22) Filed: Apr. 26, 2021

(51) Int. Cl.
| | |
|---|---|
| *H04L 12/24* | (2006.01) |
| *H04L 29/08* | (2006.01) |
| *H04L 41/084* | (2022.01) |
| *H04L 41/08* | (2022.01) |
| *H04L 29/06* | (2006.01) |
| *H04L 41/0893* | (2022.01) |
| *H04L 41/0806* | (2022.01) |

(52) U.S. Cl.
CPC ........ *H04L 41/084* (2013.01); *H04L 41/0806* (2013.01); *H04L 41/0883* (2013.01); *H04L 41/0893* (2013.01); *H04L 63/18* (2013.01)

(58) Field of Classification Search
CPC ............... H04L 41/084; H04L 41/0806; H04L 41/0883; H04L 41/0893; H04L 41/08; H04L 47/781; H04L 63/18
USPC ........................................................ 709/220
See application file for complete search history.

(56) References Cited

U.S. PATENT DOCUMENTS

| | | | |
|---|---|---|---|
| 9,658,874 B2 * | 5/2017 | Ashok ..................... G06F 9/505 |
| 10,684,895 B1 * | 6/2020 | Goel ....................... G06F 9/455 |
| 10,791,168 B1 * | 9/2020 | Dilley ................... H04L 67/288 |
| 2003/0033450 A1 | 2/2003 | Appleby-alis | |

(Continued)

FOREIGN PATENT DOCUMENTS

WO    WO-2017023310 A1 *   2/2017   ........... G06F 9/5072

OTHER PUBLICATIONS https://help.fasthosts.co.uk/app/answers/detail/a_id/1296/~/installing-sof . . . ; Installing software on a Classic Server from a remote ISO image downloaded Apr. 9, 2021; pp. 1-7.

(Continued)

*Primary Examiner* — Ruolei Zong
(74) *Attorney, Agent, or Firm* — Guntin & Gust, PLC; Ralph Trementozzi

(57) ABSTRACT

Aspects of the subject disclosure may include, for example, determining, an application requirement for a server of a data center geographically separated from a central location. A configuration file adapted for the server according to the application requirement is obtained at the central location and a host processor located at the data center is selected according to the application requirement. A static IP address preassigned to an administrative portion of the selected host processor is identified. The selected host processor is initialized remotely over a wide area network via the administrative port without utilizing any software resources pre-existing at the data center. The initializing configures the selected host processor according to the configuration file to service the application requirement. Other embodiments are disclosed.

20 Claims, 9 Drawing Sheets

(56) References Cited

U.S. PATENT DOCUMENTS

| | | |
|---|---|---|
| 2005/0229154 A1 | 10/2005 | Hiew et al. |
| 2006/0250970 A1 | 11/2006 | Gao et al. |
| 2007/0100977 A1 | 5/2007 | Barry |
| 2007/0288652 A1* | 12/2007 | Carter .................... H04L 65/40 709/241 |
| 2009/0019535 A1 | 1/2009 | Mishra et al. |
| 2011/0246627 A1* | 10/2011 | Kern ..................... G06F 9/5072 709/220 |
| 2012/0079277 A1 | 3/2012 | Ng |
| 2013/0054426 A1 | 2/2013 | Rowland et al. |
| 2013/0097306 A1 | 4/2013 | Dhunay |
| 2013/0103218 A1 | 4/2013 | Das et al. |
| 2013/0290543 A1 | 10/2013 | Lochhead et al. |
| 2014/0040473 A1* | 2/2014 | Ho ....................... G06F 9/5072 709/226 |
| 2014/0380307 A1* | 12/2014 | Zhu .................... G06F 9/45558 718/1 |
| 2015/0304164 A1 | 10/2015 | Goetje |
| 2016/0259795 A1* | 9/2016 | Brandys ................ G06F 40/197 |
| 2017/0171024 A1* | 6/2017 | Anerousis ............... H04L 67/10 |

OTHER PUBLICATIONS

Oracle® Server X6-2 Installation Guide for Oracle VM; Jan. 2017, p. 1046.

* cited by examiner

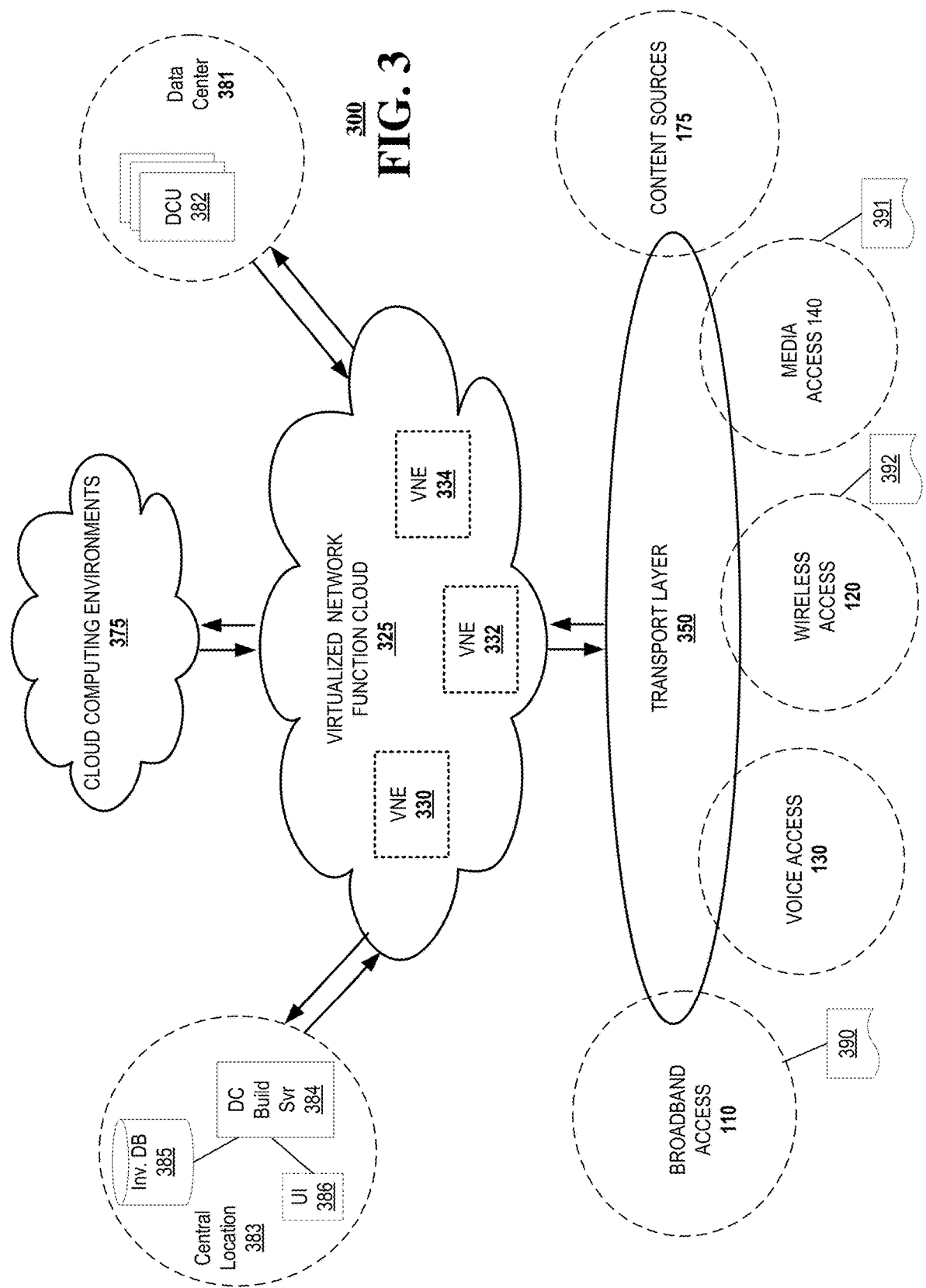

SYSTEM AND METHOD FOR REMOTE CONFIGURATION OF SCALABLE DATACENTER

FIELD OF THE DISCLOSURE

The subject disclosure relates to a system and method for remote configuration of scalable data center.

BACKGROUND

A data center houses a collection of electronic devices, such as servers, computer storage devices and/or networking equipment, that are accessed by users over a communications network (e.g., a wide area network (WAN) such as the Internet). By way of example only, the resources of a data center may comprise servers, storage, switches, routers, or modems. Often, data centers provide support for corporate websites and services, web hosting companies, telephony service providers, internet service providers, or application service providers. Some data centers provide for virtualization of various resources within the data center. For example, a data center may include a server pool from which servers may be dynamically provisioned to form one or more virtual networks. The virtual networks may then be provisioned to one or more clients.

The computing devices may be interconnected with two different networks: (i) an in-band network for conveying the data upon which the computing devices operate, for example, content in webpages, queries and query responses, and data for high-performance computing; and (ii) an out-of-band management network for conveying commands to the individual computing devices to manage their operation, e.g., for conveying information like sensor data indicative of the operation of the computing devices or for remote serial console sessions for server management.

Out-of-band management may serve a number of purposes, such as managing security risks, by limiting the attack surface of a network that could be used to control the computing devices and segregating the in-band network that often receives data from the outside world. In at least some instances, out-of-band management networks are operative to control the computing devices even when the computing devices are turned off, for example, by accessing memory on computing devices that is persistent (like flash memory) to perform things like extensible firmware interface (e.g., BIOS or UEFI) updates, read values from registers indicative of configuration or state, and the like. Other examples of activities include booting a device that is been turned off, remote installation of operating systems, updates, setting hardware clock speeds, updating or querying firmware versions, and the like.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
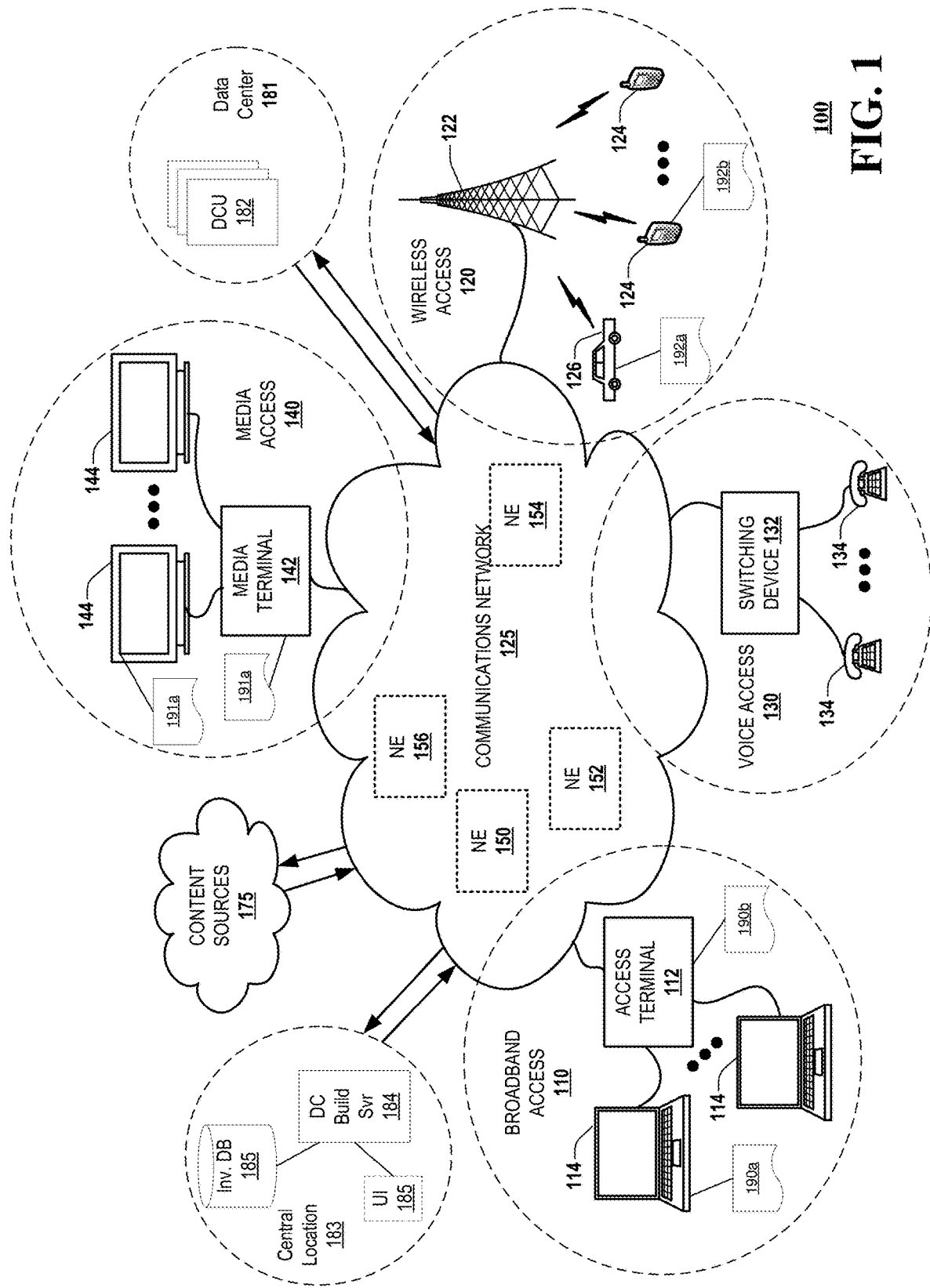
FIG. 1 is a block diagram illustrating an exemplary, non-limiting embodiment of a communications network in accordance with various aspects described herein.

The subject disclosure describes, among other things, illustrative embodiments for determining compute host configurations dynamically in response to changing requirements and building network compute hosts on a hybrid data center remotely from a centrally located, dynamically generated boot file. Other embodiments are described in the subject disclosure.

One or more aspects of the subject disclosure include a process that includes determining, by a processing system including a processor at a centralized location, an application requirement for a server of a data center geographically separated from the centralized location. A configuration file adapted for the server according to the application requirement is retrieved, by the processing system and a host processor located at the data center is selected, by the processing system and according to the application requirement to obtain a selected host processor. A static internet protocol (IP) address preassigned to the selected host processor is identified by the processing system. The selected host processor is connected to a wide area network and includes an administrative port associated with the static IP address. The selected host processor is booted by the processing system remotely via the administrative port according to a boot record located at the centralized location. The selected host processor is built by the processing system and according to the configuration file, wherein, responsive to the building, configuration information is transferred securely from the centralized location to the selected host processor via the administrative port to obtain a suitably configured data center processor.

One or more aspects of the subject disclosure include a device, that includes a processing system having a processor at a centralized location and a memory that stores executable instructions. The executable instructions, when executed by the processing system, facilitate performance of operations that include determining an application requirement for a server of a data center geographically separated from the centralized location. According to execution of the executable instructions, a configuration file is obtained that is adapted for the server according to the application requirement. Further, a host processor located at the data center is selected according to the application requirement to obtain a selected host processor. A static internet protocol (IP) address preassigned to the selected host processor is identified, wherein the selected host processor is connected to a wide area network and comprises an administrative port associated with the static IP address. According to execution of the executable instructions, the selected host processor is booted remotely via the administrative port without utilizing any pre-existing software resources available at the data center. The selected host processor configured according to the configuration file, wherein, responsive to the configuring, configuration information is transferred securely from the centralized location to the selected host processor via the administrative port to obtain a suitably configured data center processor.

One or more aspects of the subject disclosure include a non-transitory, machine-readable medium including executable instructions that, when executed by a processing system including a processor, facilitate performance of operations. The operations include determining, an application requirement for a server of a data center geographically separated from a central location. The operations further include obtaining, at the central location, a configuration file adapted for the server according to the application requirement. A host processor located at the data center is selected according to the application requirement to obtain a selected host processor and a static internet protocol (IP) address preassigned to the selected host processor is identified. The selected host processor is connected to a wide area network and includes an administrative port associated with the static IP address. The selected host processor is initialized remotely via the administrative port without utilizing any software resources pre-existing at the data center, such that initialization of the selected host processor configures the selected host processor according to the configuration file to service the application requirement.

Previously, deployment of network compute servers on hybrid data centers can be very complex and inefficient. According to traditional techniques, when a new data center needs to be built, an initial bootstrap environment is built locally, at the new data center location. This technique is sometimes referred to as a bootstrap, using one or more seed hosts, or genesis nodes. Site engineers may be deployed to the data center to configure and construct a such seed host that, in turn, may be utilized by local site technicians to build out a complete suite of network compute environments. A data center, by design, is a facility containing and supporting a large number of compute hosts that may be configured according to one or more of a particular service provider, and/or tenant, and/or application. As requirements evolve, some compute hosts may be re-purposed, while excess capacity of others may be applied to unmet requirements. Alternatively or in addition, new compute hosts may be deployed to the data center and configured according to one or more requirements.

It is understood that data centers may be strategically located according to one or more of available resources, tenants, subscribers, and the like. Consequently, one service provider may utilize many geographically dispersed data centers. Physical deployment of teams to the data centers can be expensive and time consuming. For example, each traditional data center may require separate hardware for bootstrap functions that would have to be provisioned before any building and/or reconfiguring of the rest of the data center could be accomplished. Physical deployments of a team to one data center location generally means they would not be available to tend to another data center location—no overlap. Such limitations would tend to hinder a service provider's responsiveness to accelerating and/or changing business needs, e.g., if a new data center needs to be built, or an existing one modified quickly.

Some technologies have been applied to build and/or otherwise expand or modify data centers remotely, but such approaches would necessarily expose network resources to security risks, as they need to open network protocols such as DHCP (Dynamic Host Configuration Protocol) and tftp-boot to be enabled over WAN links (Wide Area Networks) in order to accomplish remote building of such data center. Consequently, such remote techniques would be used on a limited scale because of the security implications. Also, with traditional bootstrap methodologies, network compute hosts on hybrid data centers using the tagged VLAN (virtual local area network) is not supported. Even when done, it is mostly involves local customization in the environment to accomplish this.

According to the techniques disclosed herein a hybrid data center may be automatically built remotely, e.g., at a centralized location, without requiring any local building of a local seed host and/or genesis infrastructure environment at the data center and without requiring application of any DHCP and/or tftpboot protocols during the build. In at least some embodiments, the remote build may be accomplished with a tagged VLAN and/or without any manual process to bring up the new data center. For example, the entire process from customization to build of network compute hosts of a data center may be completely automated, transparent, seamless and very efficient to quickly build hybrid data center compute nodes.

In at least some embodiments, a custom bootable ISO file may be created dynamically, e.g., responsive to a new requirement. The custom bootable ISO file may be prepared by assembling, combining and/or embedding whatever information, e.g., configuration information, data and/or files as may be necessary to build a compute host. By way of example, the bootable ISO files may be generated at image files, e.g., on a per-host basis, on-the-fly, according to a "blackbox" environment. For example, a blackbox may refer to the ISO image files that may be handled as black boxes, e.g., with little or no regard for any specifics of a particular ISO image file. In at least some embodiments, the ISO file images may be designed and/or otherwise created beforehand and stored in a file retrieval system, such as a database system. Accordingly, once a requirement is identified, a corresponding ISO image file may be obtained from the database with the appropriate configuration information to support the requirement. A bootable version of the ISO image file may base used to build a data center network compute host or hosts from a centralized location, remotely over a secure communication session, e.g., using HTTPS.

In at least some embodiments, the remote boot may utilize remote boot provisions of a target compute host. One example of remote boot provisions is iPXE, an open-source network boot firmware technique. Instead of using DHCP and/or tftp processes, a single TCP port is utilized on the target compute host, e.g., have been pre-assigned a static IP address. Use of a single TCP port opened for communication of the ISO image file and/or other resources as may be required according to the particular configuration. Such a "blackbox" environment allows a small host to be built at a central location site, which then pulls any needed information about the hosts to be built, e.g., network information, from a database, e.g., a central inventory database. According to the blackbox environment, a small configuration file, e.g., an image file, for the server may be compiled and built in real time, responsive to identification of a requirement for a new data center resource. It is envisioned that in at least some embodiments, a size of the file may be relatively small, e.g., just few kilobytes. The relatively small configuration or image file may facilitate, cause and/or otherwise force a remote network compute host to essentially build itself. The build process may be accomplished over a secure channel, e.g., utilizing a secure protocol, such as the HTTPS protocol. It is understood that the HTTPS protocol may be safe enough for some, if not most applications. Accordingly, the configure-build process may take place remotely across a wide area network (WAN) link, e.g., the Internet, using communications supported by a HTTPS protocol.

Referring now to FIG. 1, a block diagram is shown illustrating an example, non-limiting embodiment of a system 100 in accordance with various aspects described herein. For example, system 100 can facilitate in whole or in part, identification of a requirement for a new and/or modified compute host at a data center, generating a bootable ISO image file in real-time at a centralized location that is geographically remote from the data center, and remotely booting and building the compute host according to the ISO image file via an HTTPS. The remote boot and/or build process may be accomplished via a single TCP port of the compute host having been preassigned a static IP address. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc., for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc., can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

The system 100 includes one or more data centers 181, each housing one or more data center units (DCU) 182 providing compute host processors that may be configured and/or reconfigured to provide application services to network service provider clients and/or data center tenants. The compute hosts include one or more programmable processors along with other familiar computer architecture components, such as memory, cache memory, bus architectures, network interface cards, data storage, graphic processors, user interfaces. The data centers 181 and/or the data center units 182, e.g., the compute hosts of the data center units 182, include at least one network interface adapted to facilitate communications with the communications network 125 and/or with remote systems and/or user equipment via the communications network 125. The compute hosts may include familiar forms, such as desktop computers, mini-computers, and/or server computers, e.g., tower servers, rack servers.

The system 100 also includes one or more centralized locations 183, sometimes referred to as operation and maintenance (O&M) centers 183, that may be adapted to support O&M functions associated with one or more system elements, such as the data centers 181 and/or the data center units 182. According to the illustrative example, the O&M center 183 includes a data center build server 184 and an inventory database 185. The centralized location 183, e.g., via the data center build server 184, is in communication with the data center units 182 of the remote data center 181, via the communications network 125. It is anticipated that one or more data centers 181 may be located in geographically diverse locations according to one or more of client requirements, end-user demand, facility availability, cost management, security, and the like. According to the techniques disclosed herein, the same data center build server 184, or perhaps different data center build servers 184 at a common central location 183, may be used to add, remove, modify and/or otherwise configure one or more data center units 182 at one or more geographically diverse data centers 181.

In at least some embodiments, the data center builder server 284 has a local user interface 185 (shown in phantom). The user interface may include one or more of a display device, a data entry device, e.g., a keyboard, a pointing device, such as a touchscreen or touchpad, a mouse, a trackball and/or a stylus, and possibly one or more peripheral devices, such as a camera, a microphone, a speaker, and the like. Alternatively or in addition, one or more of the data center build server 184 or the inventory database 185 may be accessed remotely, e.g., by a client application running on a host device geographically separated from the central location 183. According to the illustrative example, one or more of the plurality of data terminals 114 and/or the access terminal 112 may be configured with data center configuration functionality 190*a*, 190*b*, generally 190. In at least some embodiments, the data center configuration functionality 190 may include an application program or app that is adapted to facilitate remote operation and/or access to data and/or functionality of the data center build server 184 and/or the inventory database 185. Likewise, one or more of the plurality of audio/video display devices 144 and/or the media terminal 142 may be configured with similar data center configuration functionality 191*a*, 191*b*, generally 191, and one or more of the mobile devices 124 and/or vehicles 126 may be configured with similar data center configuration functionality 192*a*, 192*b*, generally 192.

According to the example architecture, a network engineer may access, generate, store and/or otherwise modify, one or more configuration files adapted to configure one or more of the data center units 182 according to various network and/or client requirements. The data center configuration functionality or apps 190, 191, 192 may provide a browser tool to browse configuration files previously stored and retrievable via the inventory database 185. Alternatively or in addition, the data center configuration functionality or apps 190, 191, 192 may provide a file editor to facilitate creation of new configuration files and/or modification of previously generated configuration files retrievable via the inventory database 185. Storage of any new and/or modified configuration files may be coordinated remotely via the data center configuration functionality or apps 190. 191. 192.

Figure 2A:
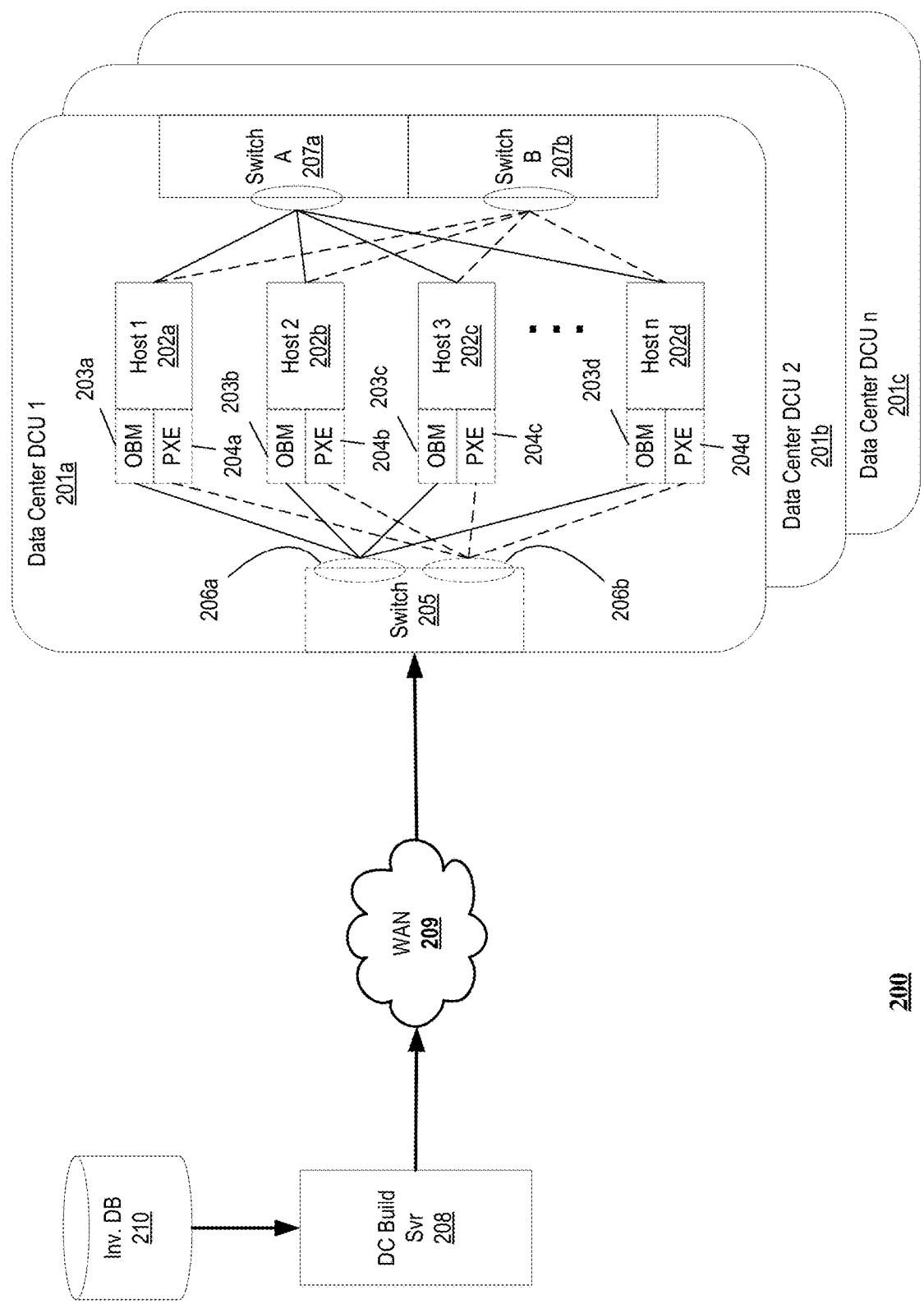
FIG. 2A is a block diagram illustrating an example, non-limiting embodiment of a remote data center configuration system functioning within the communication network of FIG. 1 in accordance with various aspects described herein.

FIG. 2A is a block diagram illustrating an example, non-limiting embodiment of a remote data center configuration system 200 functioning within the communication network of FIG. 1 in accordance with various aspects described herein. The remote data center configuration system 200 may be adapted to generate a bootable ISO image file in real-time at a centralized location that is geographically remote from a data center, such that a computer at the remote data center may be remotely booted and built according to the ISO image file via an HTTPS session over a wide area network. In at least some embodiments, the remote boot and/or build process may be accomplished via a single TCP port of the compute host having been preassigned a static IP address as disclosed in further detail below.

The remote data center configuration system 200 includes one or more data center units (DCU) 201*a*, 201*b*, 201*c*, generally 201. Each data center unit 201 includes a group of host processors, e.g., host_1 202*a*, host_2 202*b*, host_3 202*c* . . . host_n 202*d*, generally 202. In at least some embodiments in which a client-server architecture is employed, the host processor 202 may include computer hardware and/or software, e.g., computer programs, that provide functionality for other programs or devices, referred to as "clients." The host processor may include a hosting server adaptable to host and/or otherwise house one or more of websites and/or related data, applications and/or services.

The data center units 201 may be housed in a data center facility. The data center facility provides a building and/or dedicated space within a building, e.g., a computer room, or a group of buildings used to house the data center units 201, which may include computer systems, as well as other associated components, such as telecommunications and storage systems. It is common for most data center components and/or systems to be provided in a redundant manner, e.g., having backup components, which may include entirely redundant, hot swappable, data center units 201 and/or host processors 202. Other redundant infrastructure may include, without limitation, power supplies, data communication connections, environmental controls, e.g., air conditioning, fire suppression, as well as various security devices. Some data centers may be established for a single tenant, e.g., an enterprise data center, and/or for multi-tenants, e.g., an Internet hosting data center. In at least some embodiments, the data center units 201 and/or host processor 202 may include "bare-metal" servers, e.g., computer servers that host one tenant, or consumer, only. Host processors 202 that support bare-metal server applications may be distinguished from other host processors 202 providing servers that may host multiple tenants, which may, in at least some instances, utilize virtualization and/or cloud hosting. In at least some applications, bare-metal servers may be used by a single consumer without being sharable between consumers. The techniques disclosed herein may apply to bare-metal servers and/or shareable servers.

In at least some embodiments, one or more of the host processors 202 includes an out-of-band management (OBM) subsystem 203*a*, 203*b*, 203*c*, 203*d*, generally 203, shown in phantom. The OBM subsystem 203, when provided, may use one or more management interfaces (or serial ports) to facilitate remote management of servers and/or networking equipment, such as the management of the host processors 202 themselves. The OBM subsystem 203 may allow a network operator to establish trust boundaries in accessing a management function to apply it to network resources. The OBM subsystem 203 may be used to ensure management connectivity (including the ability to determine the status of any network component) independent of the status of other in-band network components. In at least some embodiments, the OBM subsystem 203 may be capable of functioning before an operating system of the host processor 202 has been booted. By way of contrast, in-band management is based on in-band connectivity and software that must be installed on the remote system being managed, e.g., the host processor 202, and would only be available after an operating system of the host processor 202 has been booted. Examples of OBM subsystems 203 include, without limitation, a remote access controller, such as the Integrated Dell Remote Access Controller (iDRAC) of Dell Technologies or Integrated Lights Out (iLo) management of Hewlett-Packard.

In at least some embodiments, hardware, e.g., host processor 202 initialization may be accomplished using firmware referred to as basic input/output system (BIOS) firmware. The BIOS may be accessed and implemented during a booting process, e.g., performed at power-on startup, to provide runtime services for operating systems and, perhaps, other programs. In at least some instances, the BIOS firmware may be pre-installed on a host processor's system board and configured as a first software to be run when powered on. Generally, booting relates to a process of starting a computer. It may be initiated by hardware such as a button press, or by a software command. After the computer is switched on, its central processing unit (CPU) typically has no software in its main memory, so some process must load software into memory before it can be executed. This may be accomplished using hardware and/or firmware in the CPU, or by a separate processor in the computer system.

A boot device generally refers to a device from which an operating system may be loaded. In at least some embodiments, BIOS firmware of the host processor 202 supports booting from various devices, typically a local solid-state drive or hard disk drive via the GPT or master boot record (MBR) on such a drive or disk, an optical disc drive, a USB mass storage device (FTL-based flash drive, SD card or multi-media card slot, USB hard disk drive, USB optical disc drive, etc.), or a network interface card, e.g., using PXE.

It is understood that in at least some embodiments, the boot process may be initiated remotely, e.g., via the WAN 209 by using a bootable ISO configuration image prepared by the data center build server 208 according to predetermined configuration data obtained via the inventory database 210. For example, the host processor 202 may be pre-configured with a network interface or port having a pre-assigned IP address. The IP address may be a static address allowing the host processor 202 to be remotely accessed by the data center build server 208. according to at least some architectures, the data center build server 208 and/or the inventory database 210 may reside behind a first firewall at a first centralized location. Alternatively or in addition, the data center units 201 may reside behind a second firewall at a geographically remote data center facility.

A secure communication session may be established over the WAN 209, e.g., the Internet.

By way of nonlimiting example, the secure communication session utilizes a hypertext transfer protocol secure (HTPS) protocol to exchange information between the data center build server 208 and one or more of the host processors 202 of one or more of the data center units 201. Information, including information of a bootable ISO configuration image file, may be transferred with adequate security based on the HTTPS protocol, from the data center build server 208 to the preconfigured portion of one of the host processors 202 of one of the data center units 201. The host processor 202, in turn, may be booted remotely according to the bootable ISO configuration image received via the preconfigured port. The ISO configuration image may include virtually all of the configuration necessary to bootstrap, initialize and/or otherwise configure the host processor 202 according to the data center requirement. Alternatively or in addition, the ISO configuration file may facilitate and/or otherwise initiate a transfer of additional configuration information from one or more of the data center build server 208, the inventory database 210, e.g., directly, and/or from another configuration server or source. Such another configuration server may reside at the centralized location, and/or at yet another location, geographically separate from the centralized location.

In at least some embodiments, one or more of the host processors 202 may pre-boot execution environment (PXE) 204a, 204b, 204c, 204d, generally 204, shown in phantom. The PXE 204, when provided, may use one or more management interfaces (or serial ports) to facilitate remote management of servers and/or networking equipment, such as the management of the host processors 202 themselves. In at least some embodiments, the PXE 204 is provided via BIOS resident in a read only memory of the host processor 202.

The system 200 also includes a data center build server 208 and an inventory database 210. The data center build server 208 is in communication with one or more of the data center units 201 and/or the host processors 202 via a wide area network (WAN) 209, such as the Internet. The data center build server 208 is also in communication with the inventory database 210. In some embodiments, the inventory database 210 is hosted on the data center build server 208, e.g., according to a database application of the 208. Inventory records of the inventory database 210 may be stored locally, e.g., utilizing a local storage device, such as an internal hard drive, an internal flash drive, a removable storage device, such as a removable flash drive, e.g., a USB drive, and/or a disk, such as an optical disk, e.g., a CD and/or DVD. Alternatively or in addition, one or more of the database application and/or inventory records may be provided via a separate service and/or database server. To the extent the inventory database 210 includes an external database system, it may be hosted locally to the data center build server 208, e.g., accessible via a local area network (LAN) at a common centralized location that is geographically remote from the data center unit 201. Alternatively or in addition, the external database system the external database system may be hosted at another remote location, e.g., accessible by the data center build server 208 via a network, such as a local area network, metropolitan area network, a wide area network, a mobile network, e.g., a mobile cellular network, and so on.

In at least some embodiments, the data center build server 208 may include executable instructions and/or be otherwise adapted to evaluate a data center requirement, to determine whether existing data center resources are available to service the requirement, whether any reconfiguration of existing data center resources may be necessary to service the data center requirement, and/or to determine whether new and/or additional data center resources are necessary to service the data center requirement. To the extent the data center build server 208 determines that a reconfiguration and/or new configuration is required, the data center build server 208 may obtain predetermined configuration data, e.g., a configuration file, form the inventory database 210. In at least some instances, network engineers may establish beforehand configuration data, e.g., one or more configuration files, according to one or more of current tenants, services, and/or applications, and/or likely future tenants, services and/or applications. The configuration files may be used to configure one or more of the data center units 201 and/or host processors 202. For example, the configuration data or files may include one or more of an application type, a tenant identifier and/or category, a security level, a data processing volume, a data processing speed and/or delay requirement, a communication type and/or channel capacity, acceptable delay, jitter, and so on.

By way of example, the data center build server 208 may compare the data center requirement to available and/or otherwise already configured data center resources, such as a first group of data center units 201 and/or host processors 202 that are configured. To the extent the data center build server 208 determines that the data center requirement may be met by available, already configured resources, one or more of the first group of data center units 201 and/or host processors 202 may be allocated to the requirement by the data center build server 208. For example and without limitation, the requirement may be an expansion of an existing streaming service for a streaming services tenant, or a provisioning of a web server for another tenant.

It is understood any determination and/or conclusion as to an availability of spare data center capacity may consider one or more of historical data, such as usage patterns, processor utilization, channel capacity, delays, disk utilization, power consumption, cooling, and the like. Such historical usage data may be used alone or in combination with a projection of future usage conditions. For example, the data center build server 208 may evaluate historical usage patterns and apply one or more projections of future usage patterns over some projection period, e.g., a number of months, a year or longer, compare the usage patterns and/or projections to the data center requirement and conclude that the first group of configured data center units 201 and/or host processors 202 may not have sufficient capacity to support the requirement.

A "lights-out" data center, also known as a darkened or a dark data center, is a data center that, ideally, has all but eliminated the need for direct access by personnel, except under extraordinary circumstances. Because of the lack of need for staff to enter the data center, it can be operated without lighting. All of the devices are accessed and managed by remote systems, with automation programs used to perform unattended operations. Lights-out management is a type of out-of-band (OOB) management that allows a system administrator to monitor and manage data center resources, such as the data center units 201 and/or the host processors 202 by remote control. In at least some embodiments, a lights-out management system includes a lights-out management module or system and a program that facilitates a continuous monitoring of data center variables, such as microprocessor temperatures, rack temperatures, power consumption and/or processor utilization.

It is envisioned that a lights-out module and/or monitored information obtained by a lights-out management system may be used in evaluation and/or accessing a requirement for an expansion and/or repurposing of one or more data center units 201 and/or host processors 202. For example, a data center may be provisioned with six data center units 201, of which three may be configured according to a data center requirement and utilized to fulfill an intended purpose. The remaining three may be left unused, possibly not having any configuration information stored thereon, e.g., without having an operating system or even a boot file. Upon determining that a subsequent data center requirement requires a different data center unit 201 configuration and/or a different host processor configuration, the remote data center configuration system 200 may identify one or more unused, e.g., not yet configured, data center units 201 and/or host processors 202 that may be remotely configured via the data center build server 208, according to configuration information obtained from the inventory database 210. The data center build server 208 may select and/or otherwise prepare a configuration file, which may include a boot file. The data center build server 208 may access one or more of the host processors 202 of one or more data center units 201, the number depending upon the particular data center requirement. For example, if the requirement may be fulfilled by a single host processor 202, then the data center build server 208 may remotely configure one of a group of available host processors 202 of one of the available data center units 201.

In at least some embodiments, the data center unit 201 includes a signal director adapted to facilitate connection of the preassigned port of a group of host processors 202 to the WAN 209. According to the illustrative example, the signal director includes a switch 205. The switch 205 may facilitate shared access of the WAN 209 among two or more of the host processors 202. For example, the switch 205 has a first port 206a or series of ports connected to the OBM subsystem 203. Alternatively or in addition, the switch 205 has a second port 206b or series of ports connected to a port associated with the PXE 204. The switch 205 may be adapted to handle out-of-band traffic and/or in-band traffic. In at least some embodiments in which the host processors 202 are provided with PXE 204, the PXE 204 may be prevented from launching upon power on and/or otherwise disabled to permit a remote system boot and/or configuration via the preassigned port, using a preassigned static IP address via an HTTPS communication session with the data center build server 208 via the WAN 209.

In at least some embodiments, the data center unit 201 includes one or more other switches adapted to handle in-band traffic. According to the illustrative example, a first switch 207a is in communication with a first group of the host processors 202 of the data center unit 201. Likewise, a second switch 207b is in communication with a second group of the host processors 202 of the same data center unit 201. The switches 207a, 207b, generally 207 may be adapted to facilitate in-band communications of one or more suitably configured host processors 202 of the data center unit 201.

The example system configuration anticipates that host processors 202 may be prearranged in a data center unit 201, shipped to a data center location that is geographically separated from the central location of the data center build server 208. Site technician support at the data center location may be limited to unpacking, inspecting and connecting the data center unit 201 to a power source and a network connection that may include a LAN and/or WAN connection. According to the illustrative example, multiple host processors 202 of a single data center unit 201 are connected to a switch provided with the data center unit 201, e.g., all residing within a common equipment rack or cabinet.

No special configuration of the host processors 202 is necessary either prior to shipment to the data center site and/or during installation of the physical data center unit 201 to the power and network connections. Any configuration may be accomplished by site technicians and/or site engineers via the centralized data center build server 208. The site technicians and/or site engineers may access the data center build server 208 from a remote location, e.g., via a portal and/or according to a client-server configuration in which the data center build server 208 is provided as a backend server accessible by applications hosted on user equipment. Access to the backend server may be controlled and/or otherwise restricted using any suitable access and/or authorization control. Communications between user equipment and the backend server may be secured, e.g., within a firewall and/or according to a secure communications channel as may be provided by a virtual private network (VPN).

Figure 2B:
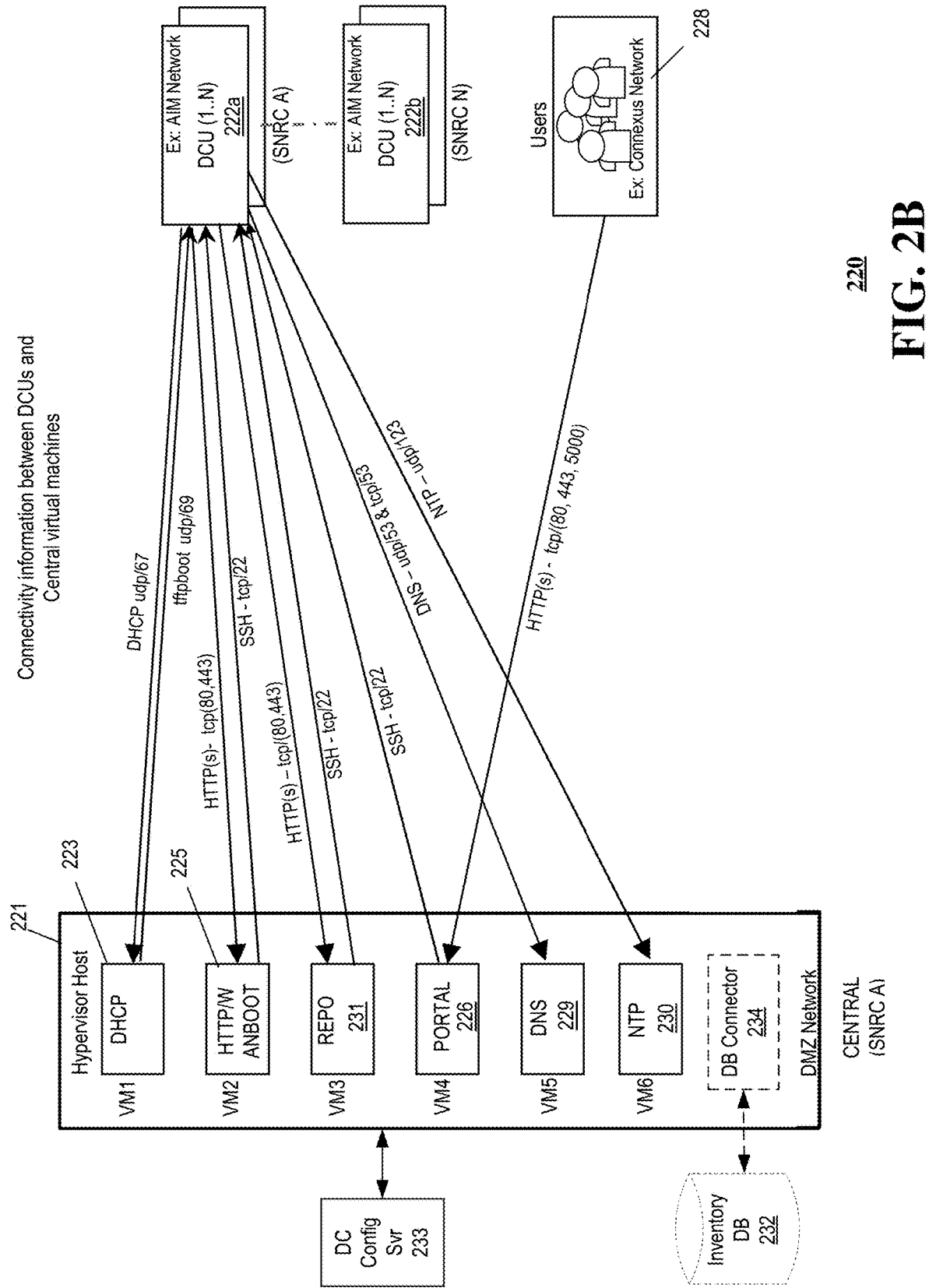
FIG. 2B is a block diagram illustrating an example, non-limiting embodiment of a hybrid data center configuration system functioning within the communication network of FIG. 1 in accordance with various aspects described herein.

FIG. 2B is a block diagram illustrating an example, non-limiting embodiment of a hybrid data center configuration system 220 functioning within the communication network of FIG. 1 in accordance with various aspects described herein. In at least some embodiments, the hybrid data center 202 may utilize technologies such as virtualization, cloud and/or software-defined networking to deliver application workloads across physical data centers and/or multi-cloud environments. Hybrid data centers offer at least some degree of application elasticity, e.g., by allowing physical resources, such as compute host processors and/or servers to be allocated, reallocated and/or otherwise repurposed according to growing, shrinking and/or changing application requirements. In at least some embodiments, a single physical resource, e.g., a compute host, may be shared among one or more different applications and/or among one or more different network service provider clients and/or data center tenants.

According to the illustrative example, the hybrid data center configuration system 220 includes a network environment 221 providing one or more virtual machines. For example, a first virtual machine VM1 provides a dynamic host configuration (DHCP) server 223. The DHCP server may be adapted to automate the process of configuring devices on IP networks, thus allowing them to use network services such as DNS, NTP, and any communication protocol based on UDP or TCP. A second virtual machine VM2 may provide an HTTP-WAN Boot server 225. The HTTP-WAN boot server 225 may facilitate a network booting of a remote compute host, such as a host processor of a first data center unit 222a.

Continuing with the illustrative example, the network environment 221 includes a third virtual machine VM3 that provides a central storage location, e.g., a software repository 231 adapted to maintain software packages from which users may retrieve software packages and install them on their computers. For example, the software repository 231 may contain a software package that may be downloaded by a suitably configured host processor of the first data center unit 222a.

Yet another virtual machine VM4 of the example network environment 221 may include a portal 226. The portal 226 may facilitate remote access by one or more users 228. For example, site engineers may use the portal 226 to generate, modify, retrieve and/or direct configuration information to one or more data center units 222. Other virtual machines VM5, VM6 may provide other services, such as domain name server (DNS) 229 and/or a network time protocol (NTP) server adapted to facilitate clock synchronization between equipment of the network environment 221 and equipment of the first data center unit 222a, e.g., the host processor 202 (FIG. 2A). The DNS server 229 may store public IP addresses and other data associated with hostnames. In particular the DNS server 229 may store a preconfigured static IP addresses of a host processor of the first data center unit 222a, facilitating remote access to the particular host processor device and/or data center unit switch 205 (FIG. 2A) over the Internet. In at least some embodiments, the network environment 221 may include yet another virtual machine, e.g., a database connector 234, adapted to facilitate access to an inventory database 232.

In at least some embodiments, the example network environment 221 may include a data center build server 233. The data center build server 233 may be adapted to facilitate generation, modification, storage and/or retrieval of configuration information via the inventory database 232. Without restriction, the configuration information may be in the form of a configuration file, such as an ISO image file that may include boot files to support a remote bootstrapping of equipment of the data center units 222 as disclosed elsewhere herein.

Configuration information retained within the database 232 may include an identification of data center units and/or compute hosts of a data center unit and/or individual compute hosts. Particular hardware devices may be identified by a suitably distinct indicia. Indicia may include, without limitation a vender-defined identification string, universally unique identifier (UUID), e.g., a 128-bit number used to identify information in computer systems, a globally unique identifier (GUID), e.g., as used, in software created by some vendors, and for mobile hosts, a mobile subscriber identification module (SIM). Still other unique identifiers may include a MAC address, a static assigned IP address and any combination of the foregoing.

Other configuration managed and/or otherwise retained within the database 232 may include a processor port number, e.g., an administrative port, and/or a static IP address assigned to an administrative port, a device type, an operating system type, an application type, a customer, subscriber and/or tenant identifier, an authorized level of security, a device utilization, device maintenance records, historical performance and/or configuration data. It is worth noting here that the configuration techniques disclosed herein may be applied to configure a new host processor that may or may not be provided with an image, e.g., the host processor may have unformatted storage, e.g., only unformatted hard drive, or a newly formatted storage, without any operating system and/or files, and the like. Alternatively or in addition, the configuration techniques may be applied to a device in which an error was encountered, e.g., the device became unusable. In at least some instances, the configuration techniques may be applied to a properly functioning and previously configured host processor that has been designated for repurposing, e.g., according to a new data center requirement.

Then database connector 243 may be adapted to permit a review, e.g., by the users 228, of available configuration data. Alternatively or in addition, the database connector 243 may be adapted to permit creation of new configuration data and/or modification of existing configuration data, each of which may be required to service a new data center requirement. The database connector 234 may provide a front end for searching, storing, retrieving and/or modifying database records as may be necessary to support operation and maintenance of data center units 222 to service data center requirements.

The data center build server 233 may be hosted on a dedicated process that may be collocated with other equipment of the example network environment 221. Alternatively or in addition, the data center build server 233 may be remote from at least some equipment of the example network environment 221, e.g., being in communication with one or more of the equipment of the example network environment 221, the inventory database 232 and/or the data center units 222 via a network connection. It is envisioned that in at least some embodiments, the data center configuration server 233 may be hosted on a virtual machine.

By way of example, one or more configurations may be prepared beforehand, e.g., by network engineers working at the centralized location, and/or working remotely through a portal, and stored within the inventory database 232 as configuration records. A datacenter units 222a may be sent to a geographically remote datacenter without first having been configured. In at least some instances, the datacenter units 222a may not be configured with an operating system and in at least some instances, without a formatted storage drive. The datacenter units 222a may be unpacked and installed at the datacenter, e.g., providing physical space, prime power, security and a network connection that is accessible via a wide area network, such as the Internet. The remotely installed datacenter unit 222a may be booted remotely via the centralized location, e.g., utilizing one or more of the HTTP/WAN Boot server 225 and/or the DHCP server 223 via the network connection. An example remote boot and configuration process is illustrated according to the message exchange shown in FIG. 2B.

Network booting may use a generic network access method provided by a network interface's boot ROM. The boot ROM may include a pre-boot execution environment (PXE) image to facilitate booting over a computer network. According to the illustrative example, the datacenter unit 222a may be assigned an IP address and accessed with the assistance of the DHCP server 223. An operating system may be stored and/or otherwise retrievable from a configuration records of the inventory database 232. At least some parts of a configuration record, e.g., parts of an operating system may be transferred to the datacenter unit 222a over the network connection, e.g., using a simple protocol such as the Trivial File Transfer Protocol (TFTP).

Figure 2C:
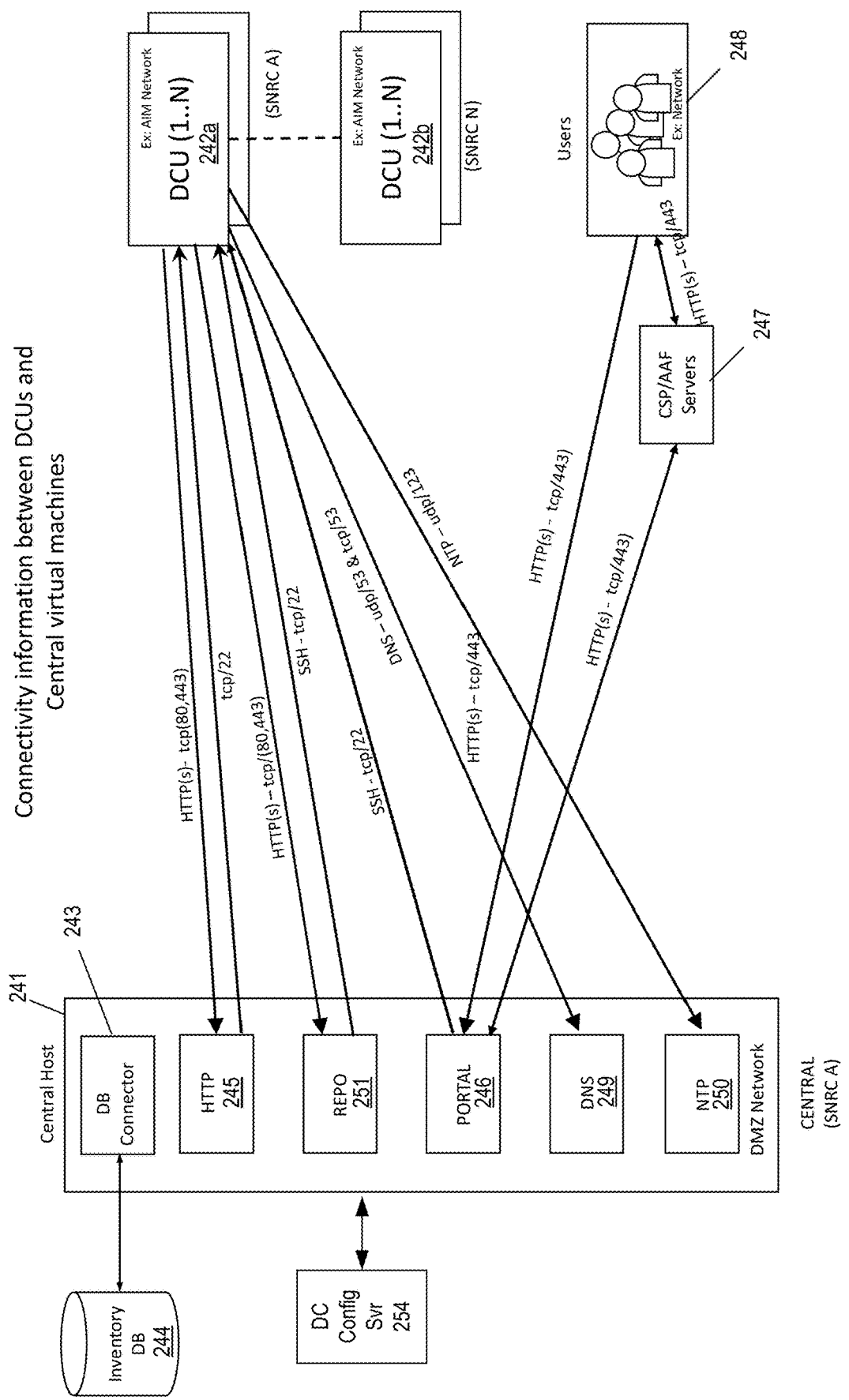
FIG. 2C is a block diagram illustrating an example, non-limiting embodiment of a remote data center configuration system functioning within the communication network of FIG. 1 in accordance with various aspects described herein.

FIG. 2C is a block diagram illustrating an example, non-limiting embodiment of a remote data center configuration system 240 functioning within the communication network of FIG. 1 in accordance with various aspects described herein. In at least some embodiments, the remote data center configuration system 240 includes a first network environment 241, that may include a centralized network environment at a location, such as a location of an operation and maintenance center, providing one or more subsystems or modules, e.g., application servers. For example, a first application server provides a hypertext transfer protocol (HTTP) server 245. The HTTP server 245 may be adapted to facilitate HTTP communications with one or more remote data center units 242a, 242b, generally 242 via a wide area network, such as the Internet. In at least some embodiments, the HTTP server 245 is adapted to support secure HTTP communications from the central network environment 241 and the remote data center unit 242 according to HTTPS, e.g., referred to as an HTTP(S) server 245.

In at least some embodiments, the HTTP(S) server 245 may provide an HTTP-WAN Boot service that facilitates a remote bootstrapping of one or more compute hosts of the data center units 242. For example, a compute host of the remote data center unit 242 may be initialized, e.g., from power on, according to a boot file accessible via the HTTP server 245.

Continuing with the illustrative example, the network environment 241 may include a software repository 251 adapted to maintain software, such as software packages from which users may retrieve software packages and install them on their computers. In at least some embodiments, the software repository 251 may include software that is utilized in a build process of one or more compute hosts of the remote data center units 242. For example, the software repository 251 may include software that is identified by a configuration file, such as an ISO image. In some embodiments, at least some software from the repository may be assembled into the ISO image before a compute host of the remote data center 242 is booted and/or otherwise configured according to the ISO image. Alternatively or in addition, the ISO image may initiate and/or otherwise direct an exchange of software from the software repository 251 to the compute host of the remote data center unit 242. The software exchange may occur via the administrative port of the compute host according to the HTTPS protocol. The software may be integral to the compute host, as determined according to the ISO image. Alternatively or in addition, the software repository 251 may contain a software package that may be downloaded during a subsequent phase of operation, e.g., after configuration of the compute host has been completed.

The network environment 241 may include a portal 226. The portal 246 may facilitate remote access to the network environment 241, and by extension, to the remote data center units 242 by one or more users 248. For example, site engineers may use the portal 246 to generate, modify, retrieve and/or direct configuration information to one or more data center units 242. Equipment of the network environment 241 may include security precautions, such as a firewall. Likewise, equipment of a data center, such as the data center units 242 may also be protected by security precautions, such as a firewall. As it is envisioned that at least some of the equipment of the network environment 241 is at a centralized location, while the data center units 242 may be geographically remote from the centralized location, communications between both locations may be secured according to one or more of the example HTTPS protocol, and/or via another security provision, such as a virtual private network (VPN).

In at least some embodiments, the remote data center configuration system 240 may include other security measures, e.g., in addition to the one or more firewalls and secure communications channel. For example, the remote data center configuration system 240 may include one or more servers providing security to guard against unauthorized access to the network environment 241 and/or the data center units 242. According to the illustrative example, the remote data center configuration system 240 includes an access restriction server 247. The access restriction server may enforce authorization process to ensure that the users 248 are authorized users. In at least some embodiments, authorization may be provided according to a layered implementation. For example, some users may be granted access to at least some of the equipment and/or services of the network environment, without having access to other equipment and/or services. By way of example, access to the database connector 243 and/or the inventory database 244 may restricted, such that authorized network engineers may have read and write access to the inventory database, while network technicians may have limited access, e.g., read access but not write access to the inventory database. The access restriction server 247 may provide an application authorization framework (AAF), e.g., providing a fine-grained authorization, such that provided authorizations are able to use an application's detailed authorizations, such as whether a user may be on a particular page or record, or whether a user has access to a particular topic or feature controlled via an app. Alternative or in addition, the access restriction server 247 may enforce a content security policy (CSP) providing an added layer of security adapted to detect and/or mitigate certain types of attacks.

Other servers may provide other services, such as domain name server (DNS) 249 and/or a network time protocol (NTP) server 250, e.g., adapted to facilitate clock synchronization between equipment of the network environment 241 and/or equipment of the data center unit 242a, e.g., the host processor 202 (FIG. 2A). The DNS server 249 may store public IP addresses and other data associated with hostnames. In particular the DNS server 249 may store a preconfigured static IP addresses of a host processor of the data center unit 242, facilitating remote access to the particular host processor device and/or data center switch 205 (FIG. 2A) over the Internet.

In at least some embodiments, the example network environment 241 may include a data center build server 252. The data center build server 252 may be adapted to facilitate generation, modification, storage and/or retrieval of configuration information via the inventory database 244. Without restriction, the configuration information may be in the form of a configuration file, such as an ISO image file that may include boot files to support a remote bootstrapping of equipment of the data center units 222 as disclosed elsewhere herein.

The data center build server 252 may be hosted on a dedicated process that may be collocated with other equipment of the example network environment 241. Alternatively or in addition, the data center build server 252 may be remote from at least some equipment of the example network environment 241, e.g., being in communication with one or more of the equipment of the example network environment 241, the inventory database 244 and/or the data center units 242 via a network connection.

Although reference is made to a centralized network environment, it is envisioned that in at least some embodiments, the network environment 241 may be distributed to at least some degree. Alternatively or in addition, one or more elements of the network environment 241 may include one or more virtual machines, e.g., instantiated and/or otherwise managed according to a cloud service.

By way of example, one or more configurations may be prepared beforehand, e.g., by network engineers working at the centralized location, and/or working remotely through a portal, and stored within the inventory database 244 as configuration records. Datacenter units 242a may be sent to a geographically remote datacenter without first having been configured for an intended purpose. In at least some instances, the datacenter units 242a may not be configured with an operating system and in at least some instances, without any formatted storage drive. The datacenter units 242a may be unpacked and installed at the datacenter, e.g., providing physical space, prime power, security, and a network connection that is accessible via a wide area network (WAN), such as the Internet. The remotely installed datacenter unit 242a may be booted remotely via the centralized location, e.g., utilizing the HTTP server 245 via a network connection, accessing the datacenter unit 242a via a preconfigured IP port of the datacenter unit 242a. An example remote boot and configuration process is illustrated according to the message exchange shown in FIG. 2C.

In more detail, a network bootstrap may utilize HTTPS to remotely boot and/or transfer configuration data to the datacenter unit 242a over a network. In at least some embodiments, the bootstrapping and/or remote configuration can be performed without use of a pre-boot execution environment, even if one should be provided on and/or otherwise available to the datacenter unit 242a. According to the illustrative example, the datacenter unit 242a may be preconfigured with an administrative port assigned a static IP address and accessed with the assistance of the HTTP server 245. An operating system may be stored and/or otherwise retrievable from a configuration records of the inventory database 244. At least some parts of a configuration record, e.g., parts of an operating system may be transferred to the datacenter unit 242a over the network connection via HTTPS. In at least some embodiments, after an initial bootstrap of the datacenter unit 242a, additional configuration data, such as one or more configuration files may be transferred from the centralized location to the datacenter unit 242a via HTTPS over the WAN. Without limitation, configuration data and/or files may include all or part of an operating system, application programs, remote server management software, BIOS updates, and the like. At least some of the configuration files may be obtained via the software repository server 246.

Figure 2D:
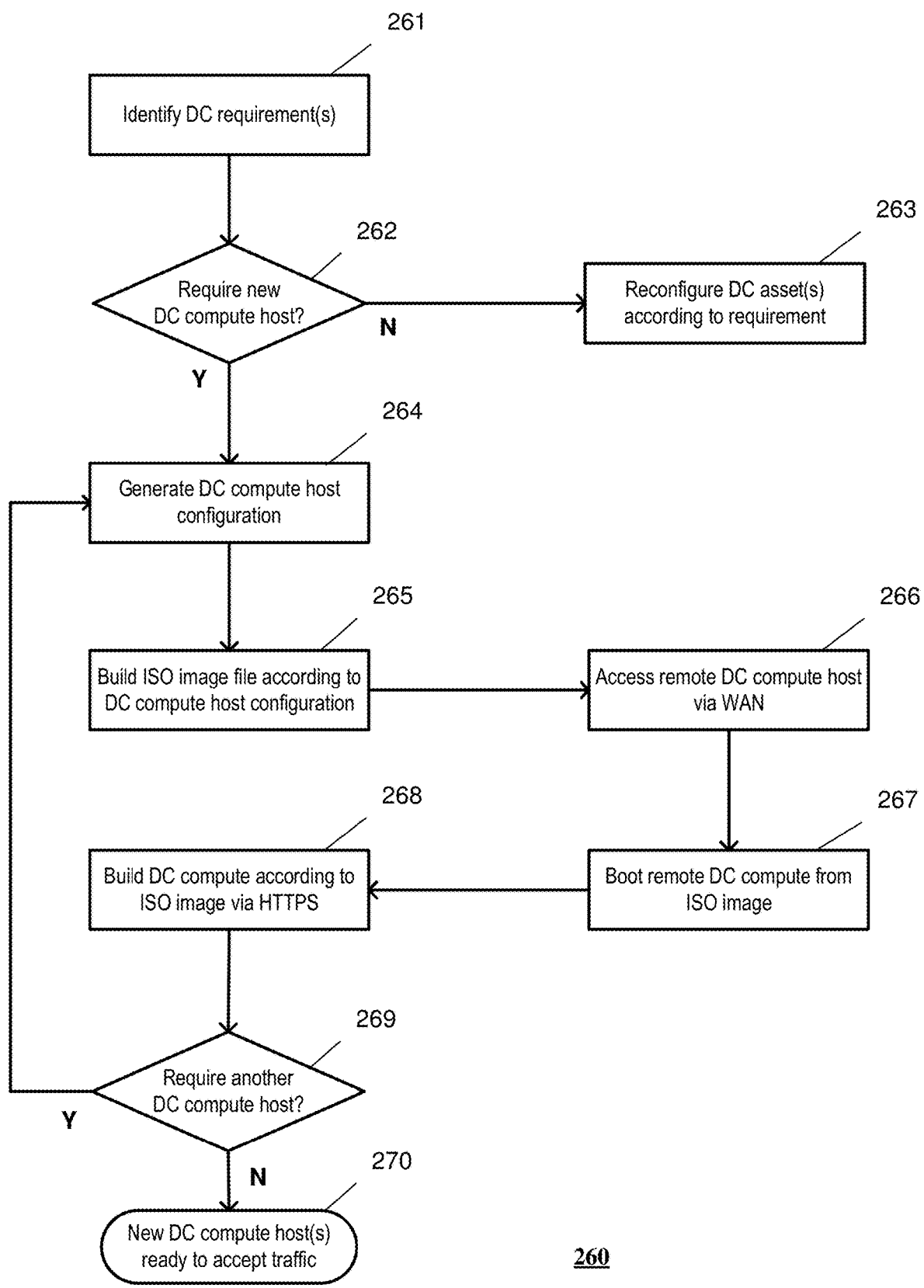
FIG. 2D depicts an illustrative embodiment of a remote data center configuration process in accordance with various aspects described herein.

FIG. 2D depicts an illustrative embodiment of a remote data center configuration process 260 in accordance with various aspects described herein. According to the process 260, or more data center requirements are identified at 261. Data center requirements may be derived from one or more of a request and/or demand for a new service and/or a modification of an existing service. Modifications may include an expansion and/or contraction of an existing service. In this regard, a configuration records for a data center asset supporting the existing service may exist within an inventory database 224 (FIG. 2C). A new service may represent a new and different service for an existing data center tenant, e.g., a web hosting tenant who plans to launch a streaming service would require an expansion of data center assets to service the new streaming service.

In at least some embodiments, one or more data centers may be dedicated to one or more particular types of services, e.g., one being adapted for web hosting applications, while another is adapted for media streaming applications. In such instances, it is envisioned that the process 260 may include a separate step in which a particular data center is identified according to its suitability in view of the identified data center requirement. For example, should the data center requirements relate to a new requirement and/or a modification of an existing requirement, e.g., an expansion, of streaming media capability, the process 260 may include a separate step that identifies a target data center. In such instances, the identification of a target may depend upon the target data center's suitability. Suitability may be determined in view of the network service providers policies and/or network architecture planning or strategy. Alternatively or in addition, suitability may be determined according to a particular feature or features of the data center requirement. By way of example, data center suitability may be determined according to one or more of a data center's available compute host capacity, its expansion capacity, e.g., its space, power and/or cooling capacity, its location, e.g., whether its location makes sense in view of potential users, network traffic, router hops, delays, and/or geopolitical requirements. For example, a data center serving a particular country or region may necessarily be located within that particular country or region, e.g., according to hosting agreements, and so on. Once a suitable data center has been selected, the process 260 may continue from step 262.

Alternatively or in addition, some data centers may be allocated and/or otherwise reserved for a particular tenant, while others may not be allocated to any particular tenants. Still others may preclude a mixing of one tenant's compute hosts with those of another tenant, such as a competitor. In such instances, identification of the data center requirements at 261 may include separately identifying a particular tenant and/or the process 260 may include a separate step of identifying a tenant and/or tenants associated with the identified data center requirement. It is envisioned further that selection of a target data center may depend upon any combination of the foregoing, e.g., suitability in combination with an identity of the particular tenant or tenants. Once a target data center has been identified, the process 260 may continue at step 262.

A determination is made at 262 as to whether a new data center compute host is required. Operation and maintenance (O&M) records and/or the inventory database may identify existing data center assets already allocated to tenants and/or tenant applications. Alternatively or in addition, the O&M records may include historical data, such as performance, past utilization, and the like. A data center configuration server 254 may compare a new data center requirement to existing data center assets to determine whether available capacity already exists. In at least some instances, available capacity may represent existing data center host processors or servers that may already be suitable configured according to the data center requirement, e.g., having sufficient processing power, storage capacity, memory, cache, and the like as may be required by an application and/or service associated with the new data center requirement. Alternatively or in addition, existing servers may be available upon which new virtual machines may be instantiated, e.g., according to a hypervisor, to address the new data center requirement.

To the extent one is not required, one or more data center assets may be reconfigured at 263 according to the new data center requirement. If the existing assets are suitably configured, then a mere reallocation and/or reservation of the asset may be sufficient to address the new data center requirement. Alternatively or in addition, if the existing assets require a reconfiguration, then the available assets may be reconfigured according to the process for configuring a new asset as described further below.

To the extent it is determined at 262 that a new compute host is required, the process 260 continues by generating a new data center compute host configuration at 264. The new configuration record may be based at least in part on a previously established configuration, e.g., a configuration of a streaming media server for a particular tenant. In at least some embodiments the existing configuration record may be used as is. Alternatively or in addition, the existing configuration records may be modified, e.g., providing a particular IP address and/or equipment identification data.

The configuration record may include a configuration file, such as a configuration image file, e.g., an ISO image file. The configuration record, whether new or modified, may be built at 265 according to the data center compute host configuration. As mentioned, the compute host configuration may be determined according to one or more of a particular tenant and/or a service or application associated with the new data center requirement.

A data center compute host 202 (FIG. 2A) is typically separated geographically from a centralized location at which the data center build server 208 and/or associated data center configuration infrastructure may be located. Thus, one such centralized location may service multiple data centers in multiple geographically separate locations. Such centralization avoids unnecessary duplication of configuration infrastructure, while alleviating travel requirements for network engineers and/or service technicians as may be necessary to service the new data center requirement. Accordingly, the data center, the data center unit 201 and/or the host processor 202 is accessed at 266 remotely from the centralized location. The access may occur over a wide area network, such as the Internet.

The accessed remote data center compute host 201 (FIG. 2A) is booted remotely at 267 via the wide area network. For example, the boot process may include a boot initialization via the ISO image file. The remote data center compute host 201 is built and/or otherwise configured according to the configuration file at 268. For example, configuration information is exchanged via an HTTPS communication exchange between a data center build server at the centralized location and the remote data center compute host. The remote data center compute host 201, having been remotely configured or built according to the configuration file is ready to accept traffic at 269. For example, the remotely configured compute host 201 may be allocated to one or more of a tenant and/or an application according to the data center requirement. It is envisioned that in at least some embodiments, the inventory database and/or O&M records are updated to reflect the newly added and/or reconfigured compute hosts 201.

In at least some embodiments, a determination is made at 270 as to whether another data center compute host is required. To the extent one is required, the process 260 may continue by generating another compute host configuration at 264, building an ISO configuration image at 265, accessing the another remote data center compute host at 266, booting the remote data center compute host from the ISO image at 267, building the remote data center compute host according to the ISO configuration image at 268 and bringing the newly configured remote data center compute host online at 270.

In at least some embodiments, the remotely configured or built compute host may be allocated to host one or more virtual machines. In at least some embodiments, the virtual machines, in turn, may be used to configure other data center compute hosts. The other data center hosts may be collocated within a common data center with the remotely configured compute host. Alternatively or in addition, the other data center hosts may be geographically separated from the remotely configured compute host, e.g., at another data center and/or at the centralized location.

While for purposes of simplicity of explanation, the respective processes are shown and described as a series of blocks in FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

The compute host configuration techniques disclosed here may be referred to as a "blackbox" concept of building network compute hosts at data centers, that may or may not include a hybrid data center, remotely from a dynamically generated configuration record, e.g., a boot file. This blackbox technique may be applied in a general sense, without regard to any particulars of a configuration, as those details are implemented by the illustrative techniques in combination with the particulars of the configuration records. According to these devices, processes and general techniques. the building of remote data centers, and in some instances, remote hybrid data centers, a relatively simple task. This simplified approach provides a scalable solution that offers significant savings in one or more of hardware costs, support costs, licensing costs, as it is no longer necessary to build a local bootstrap, and/or seed host and/or genesis node locally at each data center. Building data center assets remotely from a centralized manner speeds up data center builds and improves overall efficiency, as a core group of network engineers and/or technicians may support requirements in one or more data centers, in an overlapping manner, without requiring travel expenses and/or delays. Beneficially, resources may be added "on demand" instead of allocating resources ahead by over provisioning, wasting money and/or otherwise making expansions and/or reconfigurations of data center systems inefficient.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of system 100, the subsystems and functions of system 200, 220, 240 and processes 260, 280 presented in FIGS. 1, 2A, 2B, 2C, 2D and 3. For example, virtualized communication network 300 can facilitate in whole or in part identification of a requirement for a new and/or modified compute host at a data center, generating a bootable ISO image file in real-time at a centralized location that is geographically remote from the data center, and remotely booting and building the compute host according to the ISO image file via an HTTPS. The remote boot and/or build process may be accomplished via a single TCP port of the compute host having been preassigned a static IP address.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc., that perform some or all of the functions of network elements 150, 152, 154, 156, etc., For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc., to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc., can be instantiated and managed using an orchestration approach similar to those used in cloud compute services.

The cloud computing environments 375 can interface with the virtualized network function cloud 325 via APIs that expose functional capabilities of the VNEs 330, 332, 334, etc., to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

The virtualized communication network 300 includes one or more data centers 381, each housing one or more data center units (DCU) 382 providing compute host processors that may be configured and/or reconfigured to provide application services to network service provider clients and/or data center tenants. The data centers 381 and/or the data center units 382, e.g., the compute hosts of the data center units 382, include at least one network interface adapted to facilitate communications with the virtualized network cloud 325 and/or with remote systems and/or user equipment via the virtualized network cloud 325. The virtualized communication network 300 also includes one or more centralized O&M centers 383, that may be adapted to support O&M functions associated with one or more system elements, such as the data centers 381 and/or the data center units 382.

According to the illustrative example, the O&M center 383 includes a data center build server 384 and an inventory database 385. The centralized location 383, e.g., via the data center build server 384, is in communication with the data center units 382 of the remote data center 381, via the virtualized network cloud 325. It is anticipated that one or more data centers 381 may be located in geographically diverse locations according to one or more of client requirements, end-user demand, facility availability, cost management, security, and the like. In at least some embodiments, the data center builder server 384 has a local user interface

386 (shown in phantom). According to the illustrative example, equipment supporting broadband access 110 may be configured with data center configuration functionality or app 390. Likewise, equipment supporting the media access 140 may be configured with data center configuration functionality 391. Alternatively or in addition, equipment supporting the wireless access 120 may be configured with data center configuration functionality 392.

According to the example architecture, a network engineer may access, generate, store and/or otherwise modify, one or more configuration files adapted to configure one or more of the data center units 382 according to various network and/or client requirements. The data center configuration functionality or apps 390, 391, 392 may provide a browser tool to browse configuration files previously stored and retrievable via the inventory database 385. Alternatively or in addition, the data center configuration functionality or apps 390, 391, 392 may provide a file editor to facilitate creation of new configuration files and/or modification of previously generated configuration files retrievable via the inventory database 385. Storage of any new and/or modified configuration files may be coordinated remotely via the data center configuration functionality or apps 390, 391, 392. It envisioned that in at least some embodiments, one or more of the data center units 382 built and/or modified according to configuration files managed locally at the centralized O&M facility 383 and/or remotely via the centralized O&M facility 383, may be used to support one or more VNEs 330, 332, 334 of the virtualized network function cloud 325.

Figure 4:
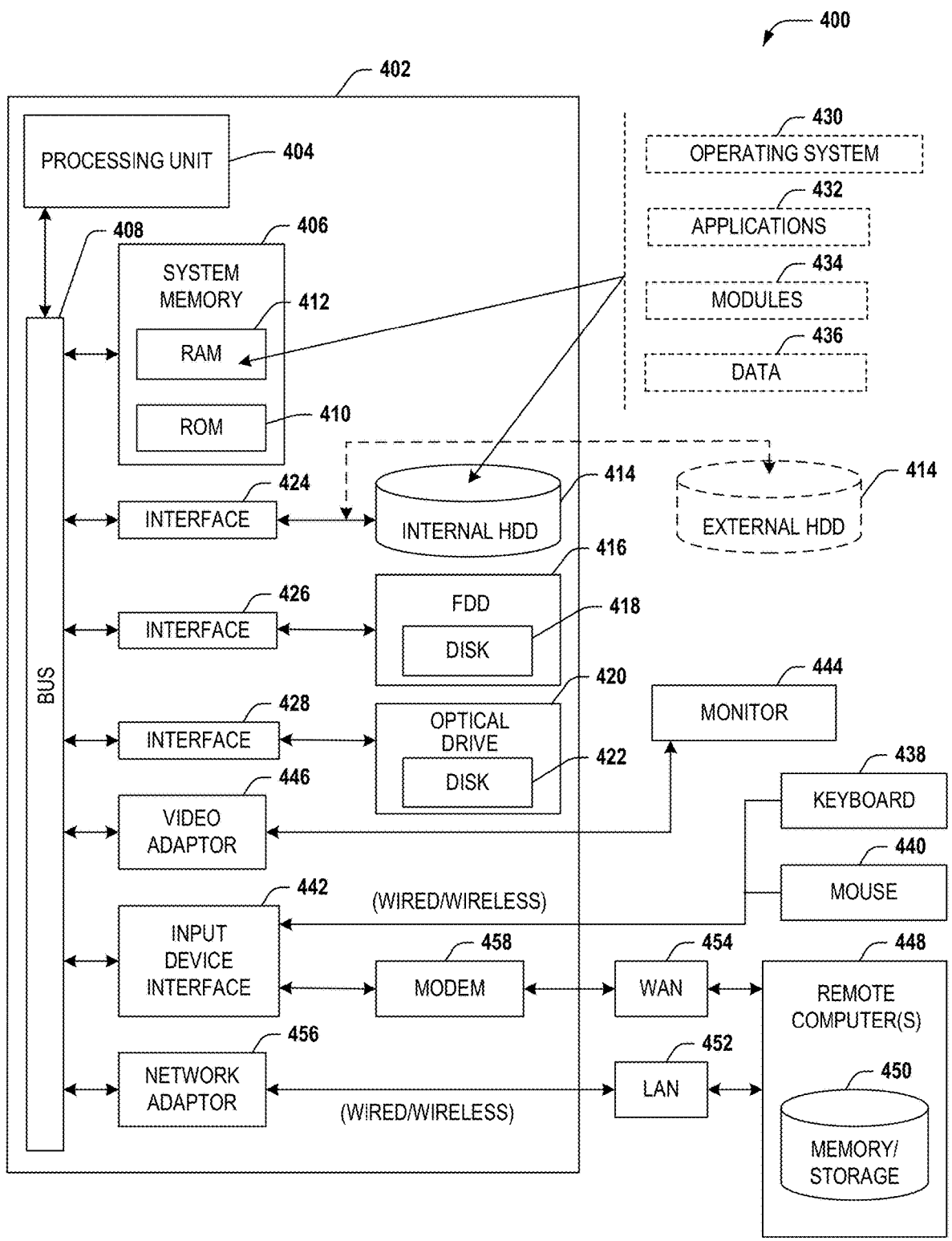
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part identification of a requirement for a new and/or modified compute host at a data center, generating a bootable ISO image file in real-time at a centralized location that is geographically remote from the data center, and remotely booting and building the compute host according to the ISO image file via an HTTPS. The remote boot and/or build process may be accomplished via a single TCP port of the compute host having been preassigned a static IP address.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456. In at least some embodiments, the network adapter 456 may be pre-configured with an IP address, e.g., a static IP address, assigned to an administrator port. The IP address may be used to provide remote access, allowing for a remote boot and/or configuration according to a geographically remote database build server 208 (FIG. 2A).

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
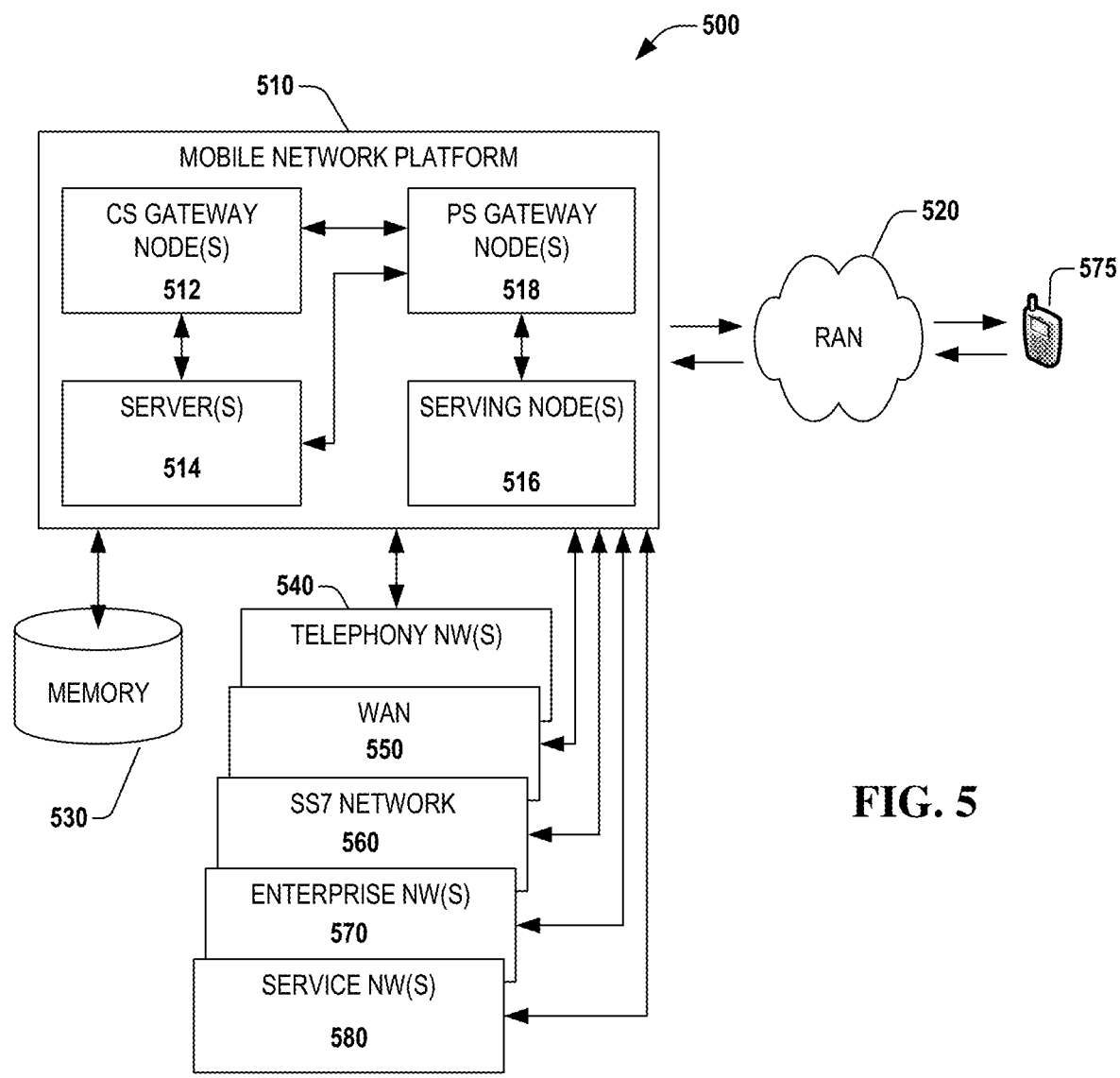
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part identification of a requirement for a new and/or modified compute host at a data center, generating a bootable ISO image file in real-time at a centralized location that is geographically remote from the data center, and remotely booting and building the compute host according to the ISO image file via an HTTPS. The remote boot and/or build process may be accomplished via a single TCP port of the compute host having been preassigned a static IP address. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc., that perform particular tasks and/or implement particular abstract data types.

Figure 6:
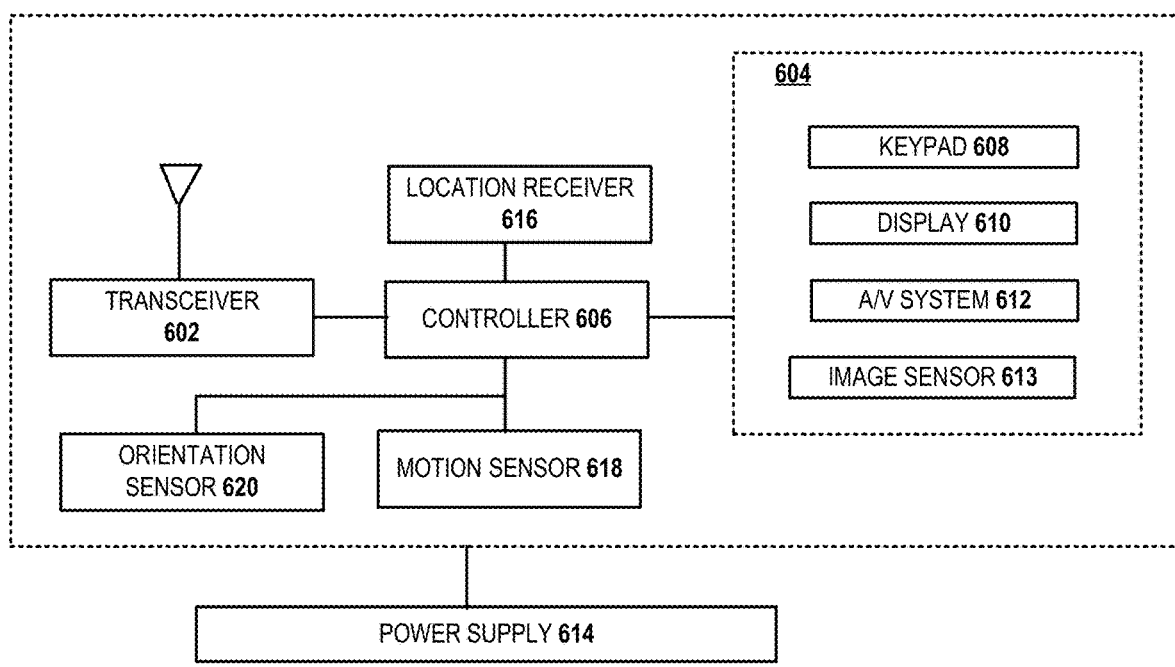
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part identification of a requirement for a new and/or modified compute host at a data center, generating a bootable ISO image file in real-time at a centralized location that is geographically remote from the data center, and remotely booting and building the compute host according to the ISO image file via an HTTPS. The remote boot and/or build process may be accomplished via a single TCP port of the compute host having been preassigned a static IP address.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc., In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)=\text{confidence (class)}$. Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc., As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method, comprising:
   determining, by a processing system including a processor at a centralized location, an application requirement for a server of a data center geographically separated from the centralized location;
   retrieving, by the processing system, a configuration file adapted for the server according to the application requirement;
   selecting, by the processing system and according to the application requirement, a host processor located at the data center to obtain a selected host processor;
   identifying, by the processing system, a static internet protocol (IP) address preassigned to the selected host processor, wherein the selected host processor is connected to a wide area network and comprises an administrative port associated with the static IP address;
   booting, by the processing system, the selected host processor remotely via the administrative port according to a boot record located at the centralized location; and
   building, by the processing system, the selected host processor according to the configuration file, wherein, responsive to the building, configuration information is transferred securely from the centralized location to the selected host processor via the administrative port to obtain a suitably configured data center processor.

2. The method of claim 1, wherein the configuration file comprises an ISO image file.

3. The method of claim 2, wherein the ISO image file comprises the boot record.

4. The method of claim 1, wherein the retrieving of the configuration file further comprises:
   obtaining, by the processing system, configuration data from a configuration database according to the application requirement; and
   organizing, by the processing system, the configuration data.

5. The method of claim 1, wherein the identifying of the static IP address further comprises identifying, by the processing system and from a data center facility configuration record, an available resource located at the data center, wherein the static IP address of the available resource is obtained via the data center facility configuration record.

6. The method of claim 1, wherein the determining of the application requirement is responsive to a request for service obtained via a portal.

7. The method of claim 1, further comprising:
   establishing, by the processing system, a secure communication channel between the processing system and the selected host processor.

8. The method of claim 7, wherein the configuration information is provided over the secure communication channel according to a hypertext transfer protocol secure (HTTPS).

9. The method of claim 1, wherein the configuration file is generated beforehand according to the application requirement.

10. The method of claim 1, wherein the determining of the application requirement is responsive to a request for service obtained via a portal.

11. A device, comprising:
   a processing system including a processor at a centralized location; and
   a memory that stores executable instructions that, when executed by the processing system, facilitate performance of operations, the operations comprising:
     determining, an application requirement for a server of a data center geographically separated from the centralized location;
     obtaining a configuration file adapted for the server according to the application requirement;
     selecting, according to the application requirement, a host processor located at the data center to obtain a selected host processor;
     identifying a static internet protocol (IP) address preassigned to the selected host processor, wherein the selected host processor is connected to a wide area network and comprises an administrative port associated with the static IP address;

booting the selected host processor remotely via the administrative port without utilizing any pre-existing software resources available at the data center; and configuring the selected host processor according to the configuration file, wherein, responsive to the configuring, configuration information is transferred securely from the centralized location to the selected host processor via the administrative port to obtain a suitably configured data center processor.

12. The device of claim 11, wherein the configuration file comprises an ISO image file.

13. The device of claim 11, wherein the obtaining of the configuration file comprises retrieving the configuration file from a configuration database according to the application requirement.

14. The device of claim 11, wherein the identifying of the static IP address further comprises identifying from a data center facility configuration record an available resource located at the data center, wherein the static IP address of the available resource is obtained via the data center facility configuration record.

15. The device of claim 11, further comprising:
establishing, by the processing system, a secure communication channel between the processing system and the selected host processor.

16. The device of claim 15, wherein the configuration information is provided over the secure communication channel according to a hypertext transfer protocol secure (HTTPS).

17. A non-transitory, machine-readable medium, comprising executable instructions that, when executed by a processing system including a processor, facilitate performance of operations, the operations comprising:

determining, an application requirement for a server of a data center geographically separated from a central location;

obtaining, at the central location, a configuration file adapted for the server according to the application requirement;

selecting, according to the application requirement, a host processor located at the data center to obtain a selected host processor;

identifying a static internet protocol (IP) address preassigned to the selected host processor, wherein the selected host processor is connected to a wide area network and comprises an administrative port associated with the static IP address; and initializing the selected host processor remotely via the administrative port without utilizing any software resources pre-existing at the data center, wherein the initializing the selected host processor configures the selected host processor according to the configuration file to service the application requirement.

18. The non-transitory, machine-readable medium of claim 17, wherein the configuration file comprises an ISO image file.

19. The non-transitory, machine-readable medium of claim 17, wherein the obtaining of the configuration file further comprises:

retrieving the configuration file from a configuration database, the configuration file having been preconfigured.

20. The non-transitory, machine-readable medium of claim 17, wherein the identifying of the static IP address further comprises identifying from a data center facility configuration record an available resource located at the data center, wherein the static IP address of the available resource is obtained via the data center facility configuration record.

* * * * *